(12) United States Patent
Chen et al.

(10) Patent No.: US 7,188,111 B2
(45) Date of Patent: Mar. 6, 2007

(54) SYSTEM AND METHOD FOR CONNECTIVITY TO STRUCTURED QUERY LANGUAGE DATABASE

(75) Inventors: Jun Chen, Morrisville, NC (US); John Goodson, Morrisville, NC (US); Peter Coppens, Duffel (BE)

(73) Assignee: Datadirect Technologies Corp., Bedford, MA (US)

( * ) Notice: Subject to any disclaimer, the term of this patent is extended or adjusted under 35 U.S.C. 154(b) by 458 days.

(21) Appl. No.: 10/617,826

(22) Filed: Jul. 14, 2003

(65) Prior Publication Data

US 2004/0088717 A1 May 6, 2004

Related U.S. Application Data

(60) Provisional application No. 60/395,321, filed on Jul. 12, 2002.

(51) Int. Cl.
*G06F 17/30* (2006.01)
(52) U.S. Cl. .................... 707/10; 707/104.1

(58) Field of Classification Search ............ 707/104.1, 707/200, 100, 1, 4, 10
See application file for complete search history.

(56) References Cited

U.S. PATENT DOCUMENTS

2003/0055826 A1* 3/2003 Graham ............... 707/10

\* cited by examiner

*Primary Examiner*—Mohammad Ali
*Assistant Examiner*—Leon J. Harper
(74) *Attorney, Agent, or Firm*—Fenwick & West LLP

(57) ABSTRACT

A system and method for conducting distributed transactions wherein a connect JDBC™ driver for a Microsoft™ SQL Server implements Java™ JTA distributed transactions. To conduct the JTA distributed transactions, JTA specific interfaces are engineered in the driver. The JDBC™ driver is a wire protocol driver in direct TCP communication with the SQL server. During communication, the JDBC™ driver sends packets of information back and forth to and from the database server. These packets may request information form the server, or instruct the server to perform a function, such as executing a stored procedure.

21 Claims, 4 Drawing Sheets

300 

```
┌─────────────────────────────────────┐
│   Application Makes a JTA Request   │──— 302
│   Through JDBC Driver for SQL Server│
└─────────────────────────────────────┘

┌─────────────────────────────────────┐
│   JDBC Driver Sends a Request Packet│
│   To The SQL Server To Execute The  │──— 304
│   Corresponding Extended Stored Procedure │
└─────────────────────────────────────┘

┌─────────────────────────────────────┐
│   The Extended Stored Procedure Makes│──— 306
│   Necessary XA Calls to XA Switch   │
└─────────────────────────────────────┘

┌─────────────────────────────────────┐
│        XA Switch Makes Necessary    │──— 307
│          Call to DTC Library        │
└─────────────────────────────────────┘

┌─────────────────────────────────────┐
│         Status is Returned to       │──— 308
│           Invoking Function         │
└─────────────────────────────────────┘

┌─────────────────────────────────────┐
│         Status is Reported to       │──— 310
│          Calling Application        │
└─────────────────────────────────────┘
```

Fig. 3

SYSTEM AND METHOD FOR CONNECTIVITY TO STRUCTURED QUERY LANGUAGE DATABASE

This nonprovisional application claims the benefit of U.S. Provisional Application No. 60/395,321, filed Jul. 12, 2002, the entirety of which is incorporated by reference.

BACKGROUND OF THE INVENTION

1. Field of the Invention

The present invention relates to systems and methods for conducting distributed transactions with database servers.

2. Description of the Related Art

A database is a collection of data that is organized so that its contents can be easily accessed, managed, and updated. Currently, the most prevalent type of database is the relational database, which is a tabular database in which data is defined so that it can be reorganized and accessed in a number of different ways. Another type of database is an object-oriented programming database, which is one that is congruent with the data defined in object classes and subclasses. In addition, there is a distributed database, which is one that can be dispersed or replicated among different points in a computer network.

Most databases contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers.

Distributed transaction processing (TP) systems use multiple databases to conduct distributed transactions. Distributed TP systems are designed to facilitate transactions that span heterogeneous, transaction-aware resources in a distributed environment. An application supported by a distributed TP system can combine into a transactional unit such diverse activities as retrieving a message from a queue, such as a Microsoft® Message Queuing (MSMQ) queue, storing the message in a database, such as Microsoft™ SQL server database, and removing all existing references to the message from a server. Because they span multiple data resources, it is important that distributed transactions maintain data consistency across all resources. A distributed TP system consists of several cooperating entities, which can reside on the same computer or on different computers.

For instance, a TP monitor is software that sits between a transaction-aware application and a collection of resources. The TP monitor maximizes operating system activities, streamlines network communications, and connects multiple clients to multiple applications that potentially access multiple data resources. Instead of writing an application that manages a multi-user, distributed environment, one can write an application that consists of single transaction requests. The monitor scales the application as required. An example is the Distributed Transaction Coordinator (DTC), which is the TP monitor for the existing Microsoft® Windows® environment.

There are also transaction managers. In a distributed transaction, each participating resource has a local transaction manager to track incoming and outgoing transactions on that computer. The TP monitor assigns one transaction manager the additional task of coordinating all activities among local transaction managers. The transaction manager that coordinates transaction activities is called the root or coordinating transaction manager. A coordinating transaction manager coordinates and manages all transaction processing functions, but it is not equipped to manage data directly. Resource managers handle these data-related activities.

In addition, there are resource managers, which are system services that manage persistent or durable data in databases, durable message queues, or transactional file systems. The resource manager stores data and performs disaster recovery.

Moreover, resource dispensers manage non-durable states that can be shared. For example, the Open Database Connectivity (ODBC) resource dispenser manages pools of database connections, reclaiming each connection when it is no longer needed.

Along with the level of data manipulation and processing, the level of database access and usage for conducting transactions has increased dramatically over the years However, a problem that exists with current technology is that there have not been systems and methods developed to implement certain transaction solutions, such as the Java™ Transaction API (JTA), for standard query language databases, such as the Microsoft® SQL database, because of insufficient network interfaces to support distributed transactions. Thus, there is a need for a new and improved system and method of implementing distributed transactions. For example, in distributed transactions, an XA switch is used to map the XA specification protocol to the database transaction management implementation. In the case of Microsoft's® SQL Server, an XA switch is provided with the SQL Server database management system that maps XA functionality to the corresponding distributed transaction coordinator transaction management facilities. However, for the Java™ Database Connectivity (JDBC™) driver to fully implement JTA, additional functionality is needed in the driver. Currently, the additional functionality does not exist. It was for this reason that a complete JTA solution with increased functionality for the SQL Server was invented as discussed below.

SUMMARY OF THE INVENTION

According to an embodiment of the present invention, a system is provided for connecting an application to a database having a database management system in order to perform a transaction. The application can reside on an application server, and the database can reside on a database server. The system includes a software driver for connecting the application to the database, wherein a transaction request is made from said application to the database via the software driver. The system also includes a distributed transaction coordinator unit residing on the database server, with the distributed transaction coordinator being arranged for receiving the database transaction request from the application. In addition the system includes a software library residing on the database server, the software library including at least one procedure for carrying out the transaction request. Further, the system includes a software transaction switch residing on the database server, said transaction switch being arranged for routing the transaction request to the distributed transaction coordinator.

According to another embodiment of the present invention, a method is provided for performing a distributed transaction by connecting an application to a database having a database management system, with the application residing on an application server and the database residing on a database server. The above method includes the steps of making a transaction request, by sending a request packet from the application server to the database to execute a plurality of stored procedures on the database. The method also includes the step of mapping the transaction request to a transaction switch and sending the transaction request, via the transaction switch, to a library in a distributed transaction coordinator. In addition, the method includes returning a status to the application server and reporting said status to the application.

According to an embodiment of the present invention, a system is provided for connecting an application to a database having a database management system in order to perform a transaction. The application can reside on an application server, and the database can reside on a database server. The system includes a software driver for connecting the application to the database, wherein a transaction request is made from said application to the database via the software driver. The system also includes a distributed transaction coordinator unit residing on the database server, with the distributed transaction coordinator being arranged for receiving the transaction request. In addition the system includes a software library residing on the database server, the software library including at least one procedure for carrying out the transaction request. Further, the system includes a software transaction switch residing on the database server, said transaction switch being arranged for routing the transaction request to the distributed transaction coordinator.

BRIEF DESCRIPTION OF THE DRAWINGS

The objects and features of the invention will be more readily understood with reference to the following description and the attached drawings, wherein:

FIG. 3 is a flow chart showing the method of conducting a general distributed transaction according to an embodiment of the present invention.

DETAILED DESCRIPTION OF THE EMBODIMENTS

Figure 1:
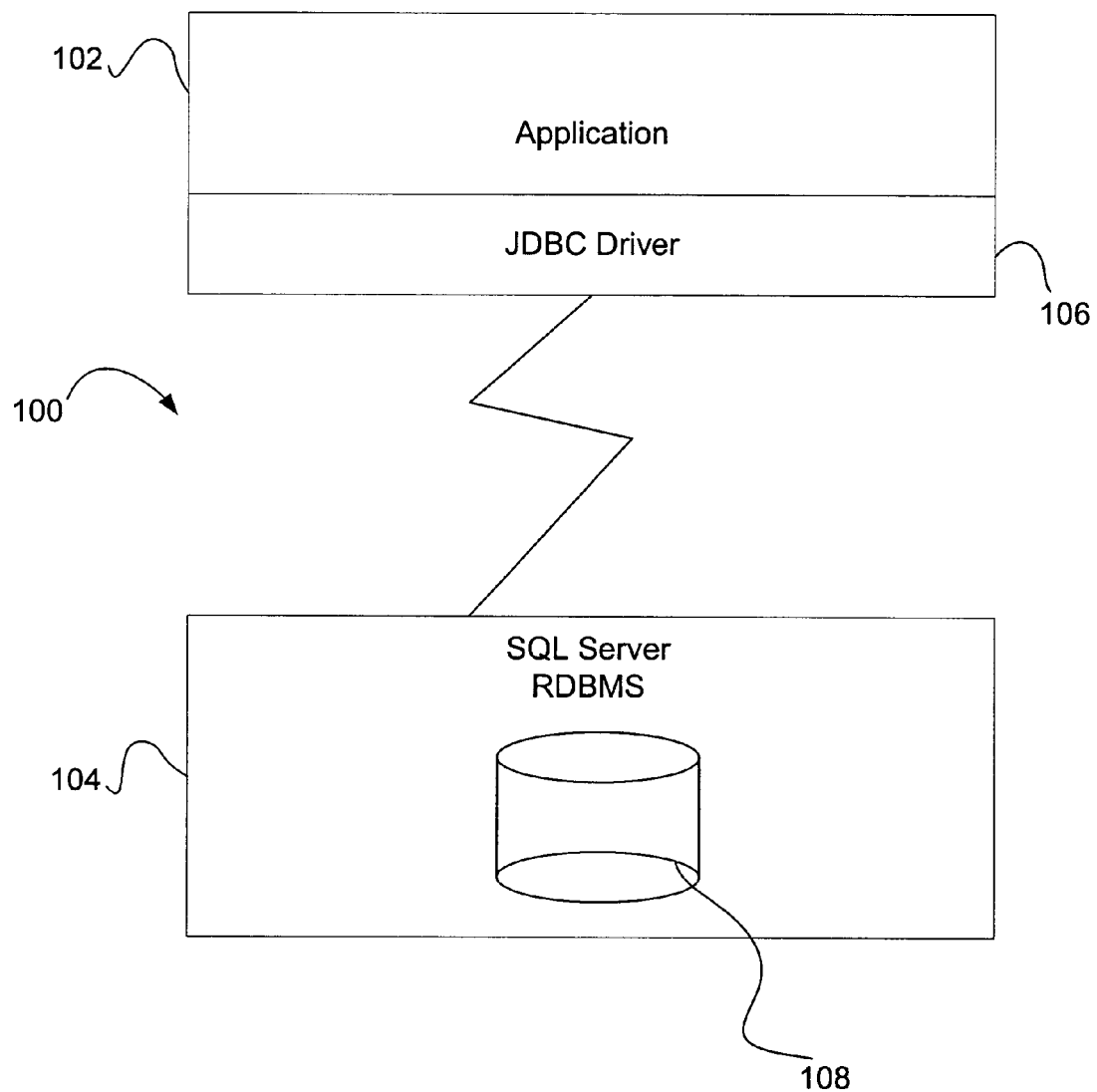
FIG. 1 is a block diagram of server and application architecture according to an embodiment of the present invention.

FIG. 1 is a block diagram 100 of a general server and application architecture for carrying out a distributed transaction, such as a JTA distributed transaction, according to an embodiment of the present invention. An application 102 communicates with the server 104 via a software driver 106. The server 104 may be an SQL server such as a Microsoft® SQL server engine 108 residing on an appropriate processor, while the driver 106 may be a Java™ JDBC™ driver as shown in FIG. 1. As shown, the application 102 and the driver 106 reside on a single client computer, and server 104 can be on a separate computer. The server 104 communicates remotely with the application 102 (client) via a network communication protocol, such as Transmission Control Protocol/Internet Protocol (TCP/IP). However, one will readily understand that the application 102, driver 106 and server 104 can all reside on the same computer.

Figure 2:
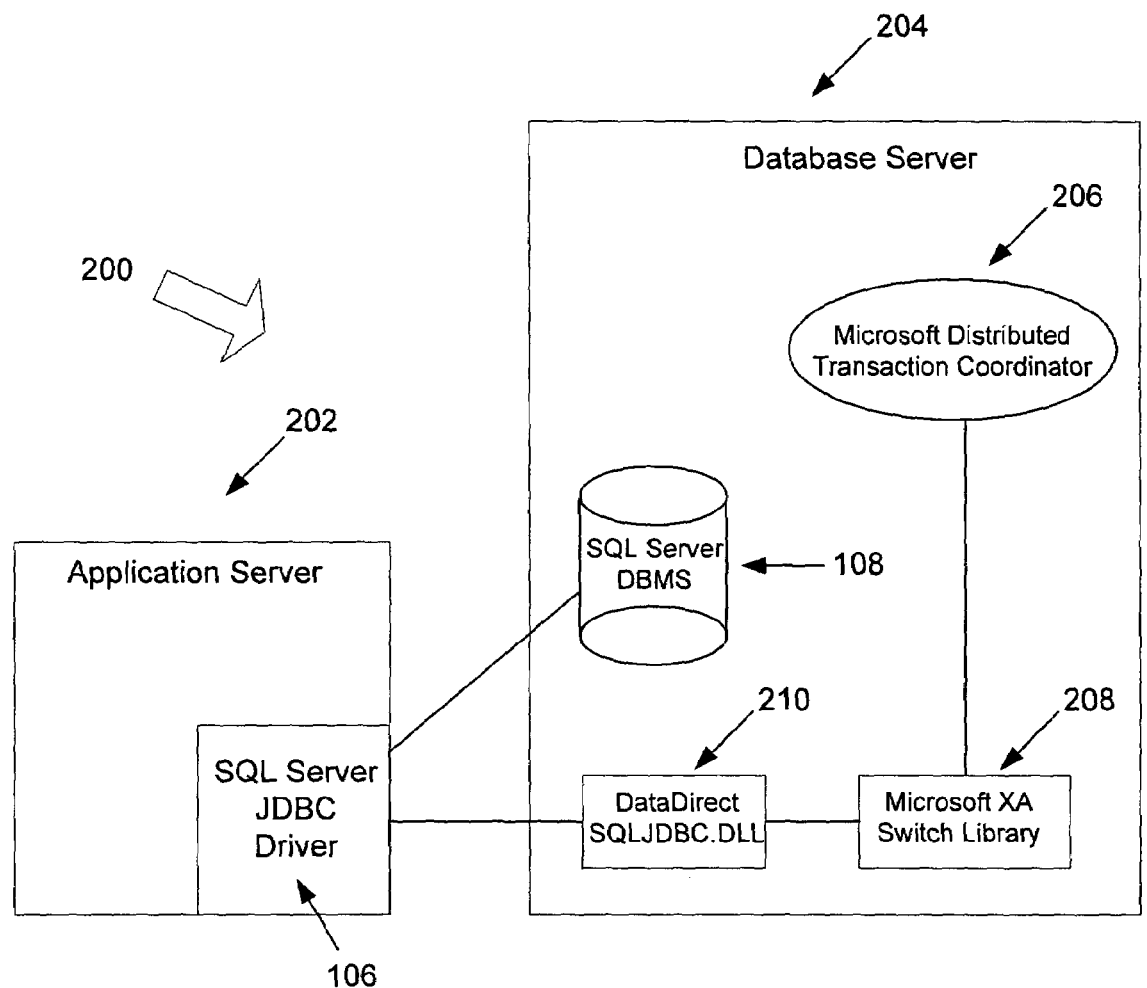
FIG. 2 is a block diagram illustrating an interaction between the components in a system of an embodiment of the present invention conducting a distributed transaction.

FIG. 2 is a more detailed block diagram of the system showing a number of module subsystems involved in a distributed transaction system according to the present invention including a Transaction Manager, a Resource Manager, an application server, and an application. The present invention supports Java™ Transaction API (JTA) distributed transactions with JDBC Microsoft® SQL servers. A JTA specifies the local Java™ interfaces that must be implemented in order to support a distributed transaction system. JTA is based on the industry standard X/Open CAE XA distributed transaction protocol.

Referring to FIG. 2, illustrated is a system 200 for conducting a JTA distributed transaction. FIG. 2 shows the interaction between various components of the system for carrying out a distributed transaction according to an embodiment of the present invention.

The system includes an application server 202 and a database server 204. The database server 204 acts as a resource manager. In this embodiment, the application server 202 and database server 204 reside of separate computers or machines. However, as previously stated, the application server 202 and the database server 204 can reside on the same computer or machine. The application server 202 can include the driver 106 for connecting to components of the database server 204.

The database server 204 can include a distributed transaction coordinator (DTC) 206, which serves as a transaction manager. The database server 204 also can include a switch 208, which maps XA protocol to the native database distributed transaction management protocol, which is, in this case, the DTC. In addition, the database server can also include a library 210 containing a set of stored procedures that will be invoked when a distributed transaction request is made and the database management system (DBMS) 108, which registers the stored procedures of the library 210.

The driver 106 is a high-level application interface that allows a transactional application to demarcate transaction boundaries. The driver 106 may be an SQL server JDBC driver as shown in FIG. 2.

A Java™ mapping of the XA protocol that allows a distributed transaction coordinator (DTC) 206 to participate in a global transaction controlled by an external transaction manager is provided through the JDBC driver 106. The DTC 206 is a high-level transaction manager interface that allows the application server 202 to control transaction boundary demarcation for an application being managed by the application server 202.

The JDBC driver 106 for SQL Database Server 204 is a wire protocol driver. This means that the driver is in a direct TCP communications session with the SQL database server 204. During a distributed transaction session, the connect JDBC driver 106 sends packets of information back and forth to and from the database server 204. These packets may request information from the database server 204, or instruct the database server 204 to perform a function, such as executing a stored procedure. The structure and format of the packets sent between the driver 106 and the server 204 can be defined by Microsoft's® Tabular Data Stream (TDS) specification. A Java™ interface has been written to provide the connection between the JDBC driver 106 and the SQL Server database 204.

In order for the connect JDBC driver 106, for the database Server 204, to implement JTA distributed transaction requests, specific JDBC interfaces are required to be engineered in the driver. These interfaces are Java™ x.sql.XA-DataSource, Java™ x.sql.XAConnection, and Java™ x.transaction.xa.XAResource. Below is an example of a definition of these interfaces and the methods that they invoke:

```
public abstract interface Java ™ x.sql.XADataSource
{
    PrintWriter getLogWriter( ) throws SQLException;
    int getLoginTimeout( ) throws SQLException;
    XAConnection getXAConnection( ) throws SQLException;
    XAConnection getXAConnection(String p0, String p1) throws
    SQLException;
    void setLogWriter(PrintWriter p0) throws SQLException;
    void setLoginTimeout(int p0) throws SQLException;
}
public abstract interface Java ™ x.sql.XAConnection extends
PooledConnection
{
    XAResource getXAResource( ) throws SQLException;
}
public interface Java ™ x.transaction.xa.XAResource
{
    abstract void commit(Xid xid, boolean onePhase);
    abstract void end(Xid xid, int flags);
    abstract void forget(Xid xid);
    abstract int getTransactionTimeout( );
    abstract boolean isSameRM(XAResource xares);
    abstract int prepare(Xid xid);
    abstract Xid[ ] recover(int flag);
    abstract void rollback(Xid xid);
    abstract boolean setTransactionTimeout(int seconds);
    abstract void start(Xid xid, int flags);
}
```

The XADataSource and XAConnection classes are mainly generic interfaces that are consistent across all Connect JDBC drivers. However, the XAResouce class is specific to each native database.

EXAMPLE

The following is a code example of an application in a JTA session:

```
SybaseDataSource xaDS = new SybaseDataSource( );
xaDS.setUser("test01");
xaDS.setPassword("test01");
xaDS.setServerName("pilot");
xaDS.setPortNumber(4100);
xaDS.setSelectMethod("cursor");
// Create XAConnection - this connects to server
XAConnection xaCon = xaDS.getXAConnection( );
// Create XAResource
XAResource xaRes = xaCon.getXAResource( );
// Create Xid for a transaction branch. See BaseXid( ) for more
details.
Xid xid = new MyXid( );
// Get connection
Connection con = xaCon.getConnection( );
// Create a statement
Statement stmt = con.createStatement( );
// Start a transaction branch
xaRes.start(xid, XAResource.TMNOFLAGS);
// DB work
stmt.executeUpdate("insert into tab values (1)");
// End the branch
xaRes.end(xid, XAResource.TMSUCCESS);
// Prepare the branch for commit
int ret = xaRes.prepare(xid);
```

-continued

```
// If it is ready to commit, commit using two phase
if (ret == XAResource.XA_OK) {
    xaRes.commit(xid, false);
}
```

In the Microsoft® Windows® environment, distributed transactions are controlled by a Distributed Transaction Coordinator (DTC) 206. This is a component of the Microsoft® Transaction Server (MTS), which is a Windows-only transaction management system. As stated above the Java™ JTA specification is based largely on the standard X/Open CAE XA distributed transaction protocol.

In order to implement a JTA solution for an SQL database Server 204, a cross mapping between the DTC distributed transaction protocol and JTA is provided. A solution has been engineered that involves using two Microsoft® dynamic load libraries, and one internally developed dynamic load library. All of these libraries reside on the database server 204. The libraries provided by Microsoft™ are the DTC library (not shown) and the XA Switch library 208. The DTC library provides distributed transaction management control, and the XA switch library 208 provides a mapping between an XA interface (not shown) and the DTC 206.

The internally developed library is called SQLJDB-C.DLL, as is shown in FIG. 2 as element 210. The SQL-JDBC.DLL library 210 can be a library written in C++, or some other appropriate language, using the Extended Stored Procedure Programming Interface. The SQLJDBC.DLL library 210 contains a set of stored procedures that the JDBC driver 106 will invoke when a JDBC application 102 makes a JTA request. The purpose of this library 110 is to map a given JTA request to its appropriate XA interface counterpart. At installation time the extended stored procedures in this DLL library 210 are registered with the SQL Server DBMS 108.

Referring to FIG. 3, a flow chart shows the steps in the method of performing a JTA distributed transaction request from an application. The steps shown in FIG. 3. make reference to the components shown in FIG. 2. First, in step 302, the application makes a request through the Connect JDBC™ driver 106 for SQL database Server 204. In step 304, The JDBC™ driver 106 sends a request packet to the SQL Server 204 to execute the corresponding extended stored procedure. In step 306, the extended stored procedure makes the necessary XA calls into the XA Switch 208. In step 180, the XA switch 208 in turn makes the necessary calls to the DTC library. When each of these steps is completed, a status is returned to the invoking function in step 308. Ultimately the status gets reported back to the calling application in step 310.

A significant problem that was overcome was implementing JTA for the SQL Server centered on the XAResource start method. As the name implies, the start method initiates a JTA transaction. The first step in any distributed transaction is the actual connection to the database. This is represented by the interaction between the JDBC™ driver 106 and the database management system 108 as shown in FIG. 2.

The critical obstacle was that when xa_start is called in the XA Switch 208, the corresponding DTC 206 call does not inform the SQL database server 204 that the given transaction has been enlisted in a distributed transaction.

Therefore, the server 204 has no knowledge that a transaction has been started for a distributed transaction.

In order to solve this problem, it was determined that the TDS specification describes a TDS stored procedure that allows a transaction to enlist in a distributed transaction.

Figure 4:
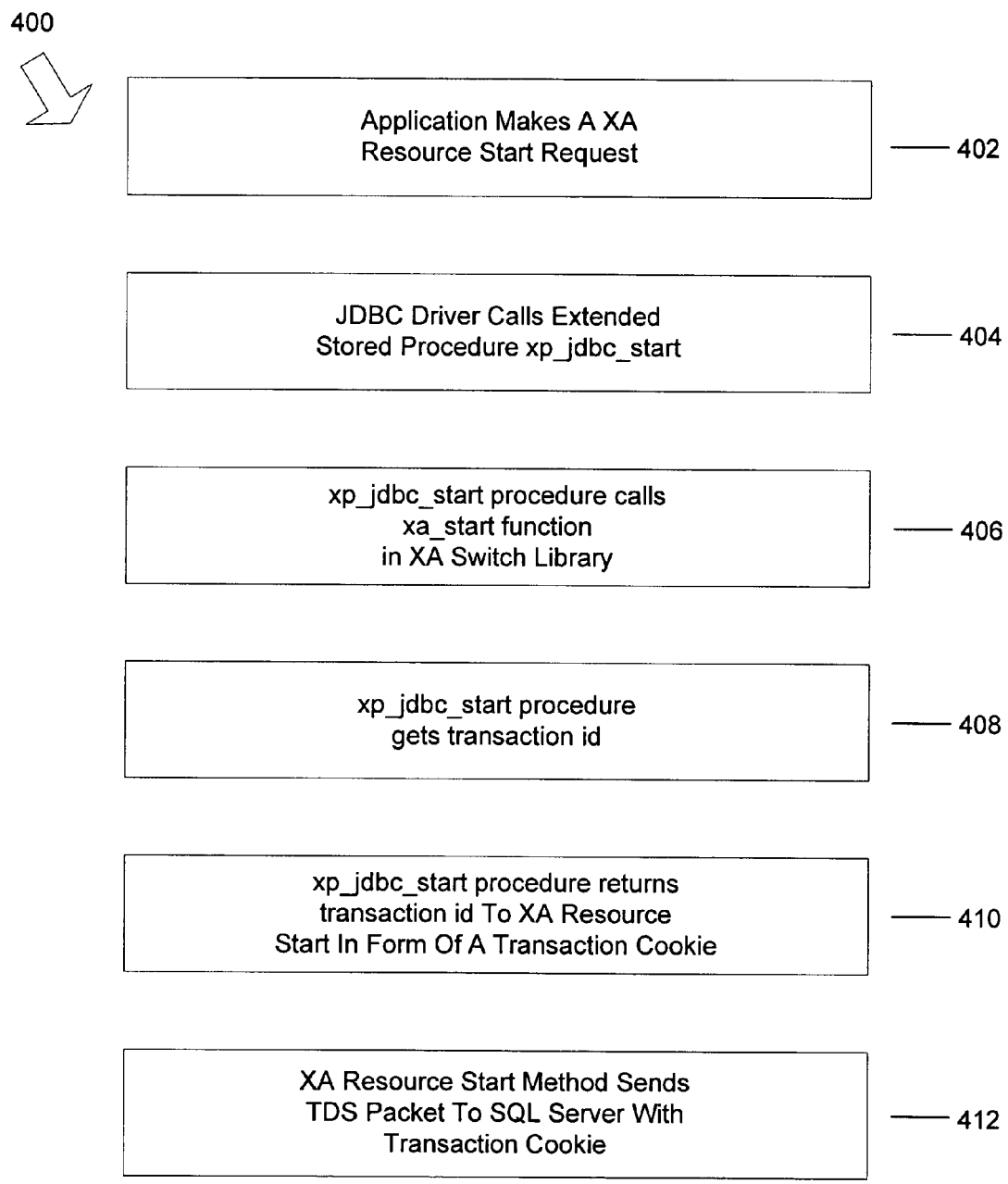
FIG. 4 is a flow chart showing the method of an XAResource start method implementation of a distributed transaction according to an embodiment of the present invention.

Based on this determination, the XAResource start method 400 was implemented in the following manner illustrated in FIG. 4, making reference to components shown in FIG. 2. When an application makes a XAResource start request in step 402, the JDBC driver 106 first calls the extended stored procedure xp_jdbc_start in step 404. This is represented by the interaction between the JDBC driver 106 and the database management system (DBMS) 108. In step 406, the xp_jdbc_start procedure calls the xa_start function in the XA Switch Library 208. This is represented by the interaction between the SQLJDBC library 210 and the XA switch library 208. Once this action has been completed successfully, the xp_jdbc_start procedure gets the transaction id in step 408 and returns it to the XAResource start method in the form of a transaction cookie in step 410. This is represented by the interaction between the SQLJDBC library 210 and JDBC driver 106. In step 412, the XAResource start method then sends a TDS packet to the SQL Server database 204 along with the transaction cookie instructing the server 204 to enlist the specified transaction in a distributed transaction. This is represented by the interaction between JDBC™ driver 106 and the DBMS 108. During a transaction as described above, the database server 204 can run in a Windows operating system environment, and the application server 202 can run on any machine that supports the Java™ Runtime Environment.

Although the invention has been described based on the above embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A system for connecting an application to a database having a database management system in order to perform a transaction, said application residing on an application server and said database residing on a database server, said system comprising:
    a software driver for connecting said application to said database, wherein a transaction request is made from said application to said database via said software driver;
    a distributed transaction coordinator unit residing on said database server, said distributed transaction coordinator including a dynamic load library that provides distributed transaction management control, and being arranged for receiving said transaction request;
    a software transaction switch residing on said database server, said transaction switch being arranged for routing said transaction request to the distributed transaction coordinator; and
    a software library residing on said database server, said software library including at least one procedure for mapping said transaction request to said transaction switch, wherein said at least one procedure communicates with said transaction switch to start a transaction process in said database based upon said transaction request, and said database receives results of said transaction process and returns results to said distributed transaction coordinator, which returns said results to said application.

2. The system of claim 1, wherein said software driver is a wire protocol driver that provides direct TCP communications sessions with the database server.

3. The system of claim 2 wherein said wire protocol driver includes interfaces to allow the database server to implement JTA distributed transactions.

4. The system of claim 1, wherein said software driver is arranged to send request packets to said database to execute said at least one procedure.

5. The system of claim 1, wherein said software transaction switch is arranged to make calls to said distributed transaction coordinator upon receipt of the transaction request.

6. A system for connecting an application to a database having a database management system in order to perform a transaction, said application and said database residing on a database server, said system comprising:
    a software driver for connecting said application to said database, wherein a transaction request is made from said application to said database via said software driver;
    a distributed transaction coordinator unit residing on said database server, said distributed transaction coordinator including a dynamic load library that provides distributed transaction management control, and being arranged for receiving said transaction request;
    a software transaction switch residing on said database server, said software transaction switch being arranged for routing said transaction request to the distributed transaction coordinator; and
    a software library residing on said database server, said software library including at least one procedure for mapping said transaction request to said transaction switch, wherein said at least one procedure communicates with said transaction switch to start a transaction process in said database based upon said transaction request, and said database receives results of said transaction process and returns results to said distributed transaction coordinator, which returns said results to said application.

7. A method for performing a distributed transaction by connecting an application to a database having a database management system, said application residing on an application server and said database residing on a database server, comprising:
    making a transaction request, by sending a request packet from said application server to said database to execute at least one of a plurality of stored procedures on said database;
    mapping said transaction request to a transaction switch residing on said database server using at least one of said stored procedures;
    sending said transaction request, via said transaction switch, to a dynamic load library in a distributed transaction coordinator residing on said database server, wherein said dynamic load library provides distributed transaction management control, and said at least one procedure communicates with said transaction switch to start a transaction process in said database based upon said transaction request, and said database receives results of said transaction process and returns results to said distributed transaction coordinator;
    returning said results to the application server; and
    reporting said results of said transaction request to the application.

8. The method of claim 7, further comprising: storing said stored procedures in a library residing on said database.

9. The method of claim 7, wherein sending a request packet includes: sending said request packet via a wire protocol driver.

10. The method of claim 9, further comprising: including interfaces in said wire protocol for implementing JTA distributed transactions.

11. The method of claim 9, further comprising: allowing a transaction to enlist a distributed transaction with at least one of said stored procedures.

12. The method of claim 7, wherein mapping said transaction request to said transaction switch includes making calls into a switch library residing on said database server to connect the application to the database.

13. A method for performing a distributed transaction by connecting an application to a database having a database management system, said application residing on an application server and said database residing on a database server, comprising:

transmitting a start request transmitted from said application to said database;

calling an extended stored procedure from a plurality of stored procedures stored in said database based on said start request, said extended stored procedure for mapping said start request to a transaction switch residing on said database server;

calling, by the extended stored procedure, a start function in a transaction switch library of said transaction switch residing on said database server;

obtaining, by the extended stored procedure, a transaction ID responsive to said start function from said database at a distributed transaction coordinator that includes a dynamic load library that provides distributed transaction management control;

returning said transaction ID to said application server; and sending a data packet to said database along with the transaction ID instructing the database server to enlist a specified transaction in a distributed transaction.

14. The method of claim 13, wherein returning said transaction ID includes: returning the transaction ID in the form of a transaction cookie.

15. The method of claim 13 wherein transmitting said start request includes: transmitting the start request via a driver on the application server.

16. The method of claim 13, further comprising: storing said plurality of stored procedures in a library located on said database.

17. The method of claim 13, wherein sending a data packet includes: sending said data packet via a wire protocol driver.

18. The method of claim 17 further comprising: including interfaces in said wire protocol driver for connecting to said database.

19. The method of claim 13, further comprising: allowing a transaction to enlist a distributed transaction with one of said plurality of procedures.

20. The method of claim 13, further including: at least one of said plurality of procedures making calls into said transaction switch library to connect the application to the database.

21. The method of claim 13, further including: said transaction switch library making calls to said distributed transaction coordinator.

* * * * *

UNITED STATES PATENT AND TRADEMARK OFFICE
CERTIFICATE OF CORRECTION

PATENT NO. : 7,188,111 B2
APPLICATION NO. : 10/617826
DATED : March 6, 2007
INVENTOR(S) : Jun Chen, John Goodson and Peter Coppens It is certified that error appears in the above-identified patent and that said Letters Patent is hereby corrected as shown below:

Title page, item [54] Abstract:

Delete the word "form" in the last sentence and insert --from-- instead.

Signed and Sealed this

Fifteenth Day of May, 2007

JON W. DUDAS
*Director of the United States Patent and Trademark Office*